Aug. 1, 1950 — L. M. CHRISTIAN — 2,517,462
ELECTRIC MOTOR

Filed May 14, 1946 — 3 Sheets-Sheet 1

INVENTOR.
*Lorin Merry Christian*

BY *Victor J. Evans & Co.*

ATTORNEYS

Aug. 1, 1950     L. M. CHRISTIAN     2,517,462
ELECTRIC MOTOR
Filed May 14, 1946     3 Sheets-Sheet 2
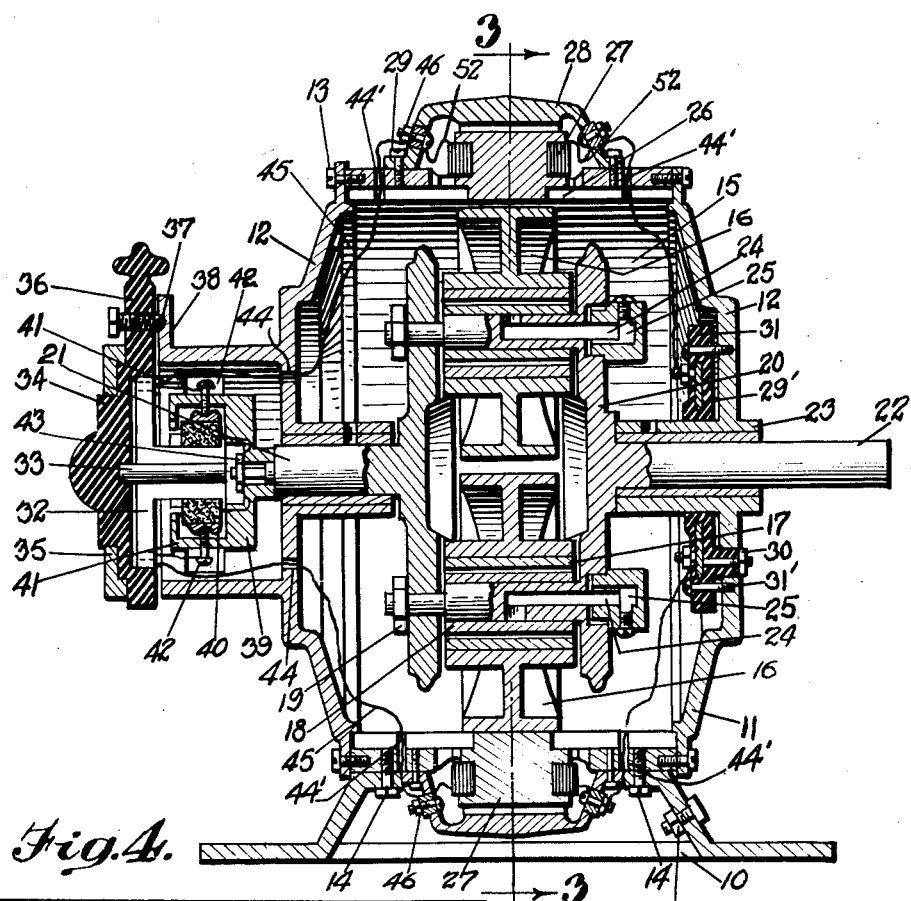
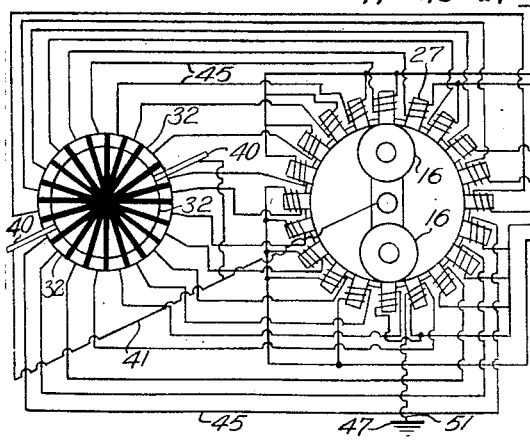
INVENTOR.
Lorin Merry Christian.
BY Victor J. Evans & Co.
ATTORNEYS Aug. 1, 1950 — L. M. CHRISTIAN — 2,517,462
ELECTRIC MOTOR
Filed May 14, 1946 — 3 Sheets-Sheet 3

INVENTOR.
Lorin Merry Christian.
BY Victor J. Evans & Co.
ATTORNEYS

Patented Aug. 1, 1950

2,517,462

UNITED STATES PATENT OFFICE 2,517,462

ELECTRIC MOTOR

Lorin M. Christian, Atlanta, Ga.

Application May 14, 1946, Serial No. 669,511

2 Claims. (Cl. 172—36)

The invention relates to an electric motor, and more especially to a reversible electric motor.

The primary object of the invention is the provision of a motor of this character, wherein it can be accelerated in either direction, therefore making it useful in any branch of service, by eliminating the circuit required by a rotating armature, this being accomplished by the use of two simple rotors, which are devoid of windings, thus eliminating the handicap of conventional motors, which cause the armature shaft and bearings therefor to become worn, with the resultant dragging of such conventional armature against the field magnets on the stator.

Another object of the invention is the provision of a motor of this character, which creates a revolving E. M. F. that attracts the rims of the two rotors in a straight line effect with an average flux density greater than that of the conventional motors, without endangering bearing and shaft damage and resultant dragging of the armature.

A further object of the invention is the provision of a motor of this character, wherein greater power is obtained from the leverage involved, the periphery of the casing of the motor serving as a fulcrum, the rims of the rotors being the leverage, these rotors combined being the main rotor worked upon, and receives the full power of the coils, as the rims act as a single lever, and the radius of the rotors can be of equal diameters, with the force of the conductor applied to the main rotor tangentially at the point of contact, thus causing the full force of the coils to be effective as power.

A further object of the invention is the provision of a motor of this character, wherein there is a decrease in windings over that required by a conventional motor having a two-way performance, and at the same time obtaining more power from the internal forces that are involved, this being accomplished by having a peripheral rolling action by the conductors with the result that the full impact of the latter are directed to the main rotor tangentially at the point they are in contact with smoother performance, more perfect balance and resultant decrease of the effort of the stator to turn in a reverse direction.

A still further object of the invention is the provision of a motor of this character, which is simple in construction, thoroughly reliable and efficient in operation, strong, durable, compact, possessed of few parts, these being readily accessible for repairs and replacements, assuring maximum power and efficiency, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 2 is a sectional view taken on the line 2—2 of Figure 1 looking in the direction of the arrows.

Figure 4 is a diagrammatic view of the wiring system of the motor.

Similar reference characters indicate corresponding parts throughout the several views in the drawings.

Figure 1:
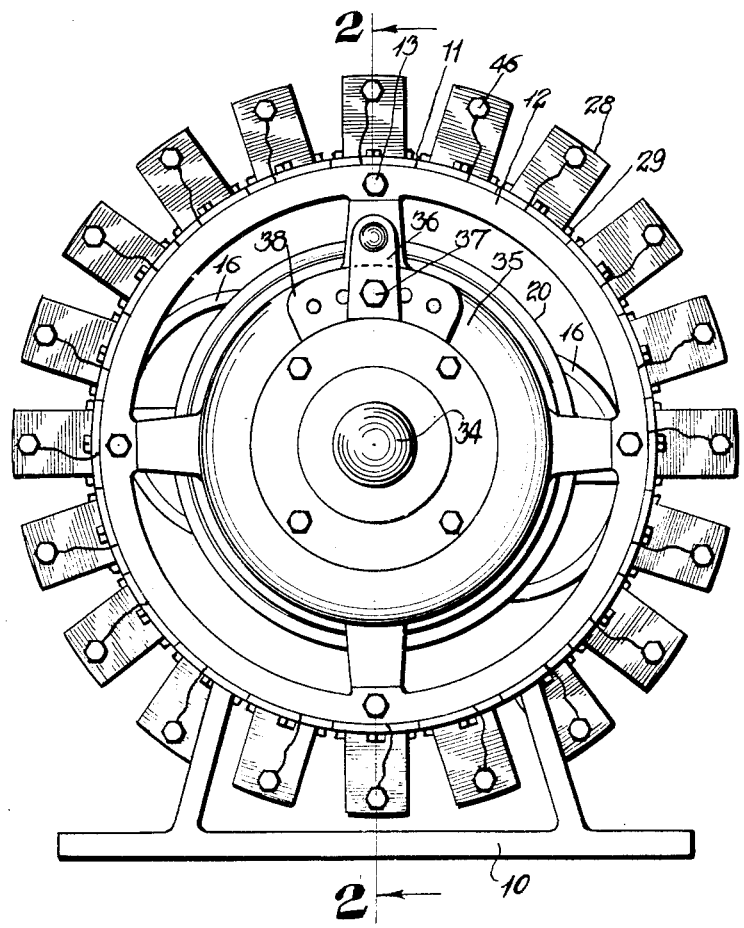
Figure 1 is a side elevation of the motor, constructed in accordance with the invention.

Referring to the drawings in detail, the motor constituting the present invention comprises a foundation or base mount 10, in which is saddled a sectional motor housing or casing involving a cylindrical shell formation 11, and outwardly disked end or side cheeks 12, which are made secure thereto by fasteners 13, the shell formation 11 being secured to the base mount 10 by fasteners 14, as best seen in Figure 2.

The inner peripherial face 15 of the shell formation 11 creates a tracking annulus for a pair of diametrically opposed wheel or roller-like conductor rotors 16, which will replace the armature usually found in electric motors. Each of the rotors 16 has a center hub 17 rotatably fitted on an eccentric 18, upon an arbor 19, adjustably carried upon a main rotor 20 within the shell formation 11. The arcs of rotation of the eccentrics 18 are concentric with the arc of rotation of the main rotor 20. The central axle portions 21 and 22, respectively, of the said rotor 20 are journalled in center bearings 23 therefor, as provided on the cheeks 12. The arbors 19 for the rotors 16 are formed with lubricating ways 24 leading from lubricant cups 25, exposed outside of the rotor 20 and within the shell formation 11, as best seen in Figure 2 of the drawings.

Figure 3:
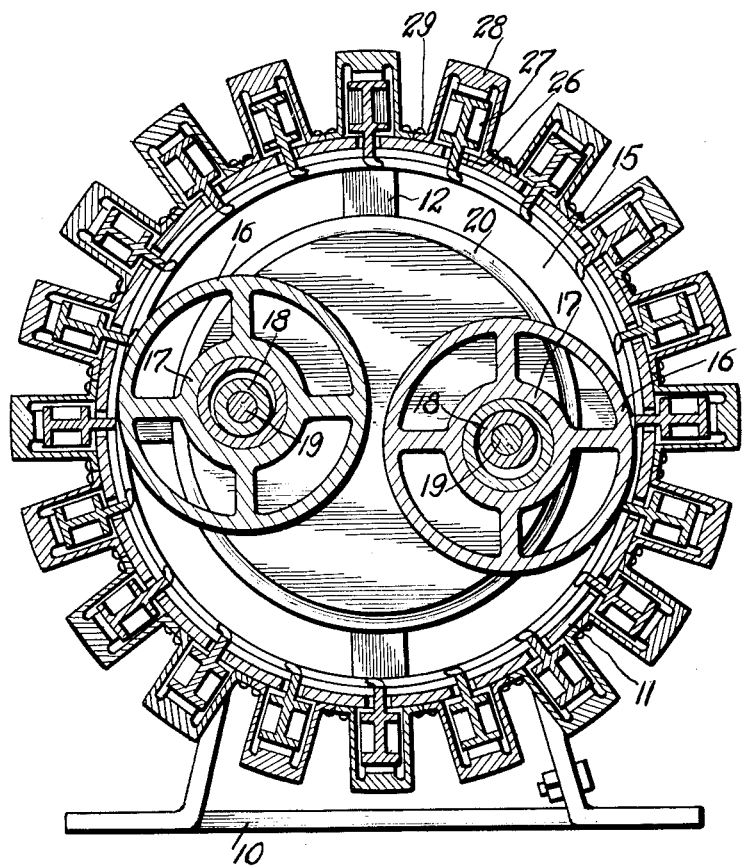
Figure 3 is a sectional view taken on the line 3—3 of Figure 2, looking in the direction of the arrows

The surface 15 creating the periphery of the shell formation 11 is of non-conductor material, and is machined with oblong slots 26 uniformly spaced from each other throughout the circumference of the shell formation, and through these slots are exposed electric coils 27 encased in covers 28 therefor which hold the said coils in place on the shell formation peripherially of the same, as best seen in Figure 3 of the drawings. The covers 28 are secured by fasteners 29 to the shell formation 11.

On one of the cheeks 12 at the inner face thereof is secured a positive conductor plate 29' of copper, having five binding posts 30, one for outside current source, and the remaining four of the said binding posts, each holding five leads from the coils 27 divided accordingly in groups of five in number, the conductor plate 29' being encased in a plastic insulation 31 and is held in place by fasteners 31' on the cheek 12 next thereto. On the opposite cheek 12 is a commutator or timer 32, it involving copper sections splined in or on a fibre shaft 33 with an end disk 34, encased in a plastic insulation 35 provided with a control lever 36, so that the commutator or timer 32 can be adjusted. The lever 36 is fitted with a spring tensioned latch 37 for engaging a keeper segment 38, for the holding of the commutator or timer in a manually adjusted position. About the shaft 33 is a brush holder 39, having brushes 40, which play through clearances for contact with the copper sections of the commutator or timer 32. The holder 39 is grounded by wires 41 to the brushes 40 which pass through a slot 42 thereto, the holder being keyed at 43 to main rotor axle portion 21 next thereto with the copper sections of the commutator connected to the coils, each series of coils will be independently grounded when the holder 39 is in contact with the particular section leading to the coils. The lever 36 in the movement will ground each series, depending upon which opening in the segment 38 is engaged by the latch 37. The commutator will then ground each series of coils separate through the ground wires 45 to the ground terminal 47. The flow of current would, therefore, be through the plate 29 to the coils, provided by the portion of the lever 36, the ground wire 42, to the ground terminal 47.

The cheeks 12 have holes 44 therein, and holes 44' in the shell 11 for receiving the ground wires 45 from a coil 27 common thereto, there being a copper section for each coil, and such wires 45 are held in place by bolts 46, and such copper sections are insulated from each other, while all ground wires are attached to a ground terminal 47 at the foundation or base mount 10. The incoming source of electrical current supply is connected to the terminal 30, it being one of the series of five thereof as hereinbefore mentioned.

In Figure 4 the source of current 48 is shown connected to the binding post 30 for the outside current source of the plate 29', and the leads 50 therefrom to the coils 27 and leads 51 from the ground wires attached to the terminal 47. The leads 41 from the brushes 40 ground leads 45 and leads 52 from bolts 46 to the respective coils 27. It is believed, therefore, that this diagrammatic view of the wiring system of the motor clearly illustrates the current layout from the incoming current source to the coils commutator and ground outlet.

In the operation of the motor, the electric circuit is from the binding post 30 just mentioned through the plate 29', thence through leads 50 to the coils 27 that are being grounded by brushes 40 having contact with a copper section of the commutator or timer 32, the current then passing the ground wire 45 to the frame of the motor and out through the ground terminal 47, the coils 27 being located on the outside of the shell formation 11, so that there is no overheating and may be easily installed.

In considering the operation of the motor the alignment of the rotators with the coil must be considered. If the current was turned on and the control lever was in a position that was neutral, there would be no movement of the rotors due to the fact that any coil in the perfect alignment with the rotors would only retain these rotors in fixed relation thereto. However, when the control lever 36 is moved counter-clockwise such movement will cause the coils adjacent to the first mentioned coils in a clockwise movement to become magnetized, thus they would attract the rotors causing the rotors to rotate. As the rotors are brought into alignment with the next coils then the circuit would be broken and the next coils magnetized in order to attract the rotors thus the same movement would be described as previously set forth, in other words as the rotor reaches the alignment with the two oppositely positioned coils the circuit will be broken and the next two coils will be magnetized causing these coils to attract the rotor, thus each set of coils must be connected in groups to cause the rotation of the rotors by these groups. Thus the movement of control lever 36 will control the speed of the motor since its degree of movement will control the amount of current that is connected to each group of coils. To stop the motor the control 36 is moved back to neutral position and will cause the opposed coils to attract and retain the rotors in perfect alignment therewith.

What is claimed is:

1. An electric motor of the kind described comprising a fixed casing having a field therein, a main rotor journalled in said casing at the center thereof, arbors in said main rotor in opposed relation to each other, eccentrics on said arbors, conductor rollers on said eccentrics and the arc of rotation of the arbors being concentric with the arc of rotation of the main rotor, a plurality of coils disposed about the exterior of the casing in spaced relation to each other, contacts on the coils in the path of the conductor rotors and adapted to be engaged by the conductor rotors, a conductor plate within the casing concentric to the axis of the main rotor, binding posts on the plate, the coils being connected to the said binding posts in groups or five, a source of external current supply connected to said conductor plate exclusive of the connection to the coils, and a commutator operated by the main rotor and having a separate electric connection with the coils with each coil having its own separate ground to the casing.

2. The invention as in claim 1 wherein means is provided for adjusting the commutator.

LORIN M. CHRISTIAN.

REFERENCES CITED

The following references are of record in the file of this patent:

UNITED STATES PATENTS

| Number | Name | Date |
|---|---|---|
| 467,318 | Thomson | Jan. 19, 1892 |
| 586,823 | Patten | July 20, 1897 |

FOREIGN PATENTS

| Number | Country | Date |
|---|---|---|
| 9,022 | Great Britain | of 1841 |